(12) United States Patent
 Kawada (10) Patent No.: US 11,792,373 B2
(45) Date of Patent: Oct. 17, 2023

(54) DISPLAY METHOD AND DISPLAY SYSTEM

(71) Applicant: SEIKO EPSON CORPORATION, Tokyo (JP)

(72) Inventor: Kenji Kawada, Hiji-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/510,649

(22) Filed: Oct. 26, 2021

(65) Prior Publication Data

US 2022/0132083 A1 Apr. 28, 2022

(30) Foreign Application Priority Data

Oct. 26, 2020 (JP) ................................. 2020-178718

(51) Int. Cl.
 *H04N 9/31* (2006.01)
 *G09G 3/00* (2006.01)
 *G09G 5/377* (2006.01)
 *G09G 5/397* (2006.01)

(52) U.S. Cl.
 CPC ........... *H04N 9/3147* (2013.01); *G09G 3/002* (2013.01); *G09G 5/377* (2013.01); *G09G 5/397* (2013.01)

(58) Field of Classification Search
 CPC ........ G09G 3/002; G09G 5/377; G09G 5/397; H04N 9/3147
 See application file for complete search history.

(56) References Cited

U.S. PATENT DOCUMENTS

| 2008/0297742 | A1  | 12/2008 | Muneishi et al. |
| 2011/0242493 | A1  | 10/2011 | Kotani |
| 2015/0077310 | A1  | 3/2015 | Inamoto et al. |
| 2015/0244998 | A1* | 8/2015 | Yanazume ........... H04N 9/3147 348/38 |
| 2016/0021348 | A1* | 1/2016 | Watanabe ................ H04N 5/74 348/745 |
| 2017/0334291 | A1* | 11/2017 | Fujita ................. G03B 21/2053 |
| 2019/0155563 | A1  | 5/2019 | Kotani |

FOREIGN PATENT DOCUMENTS

| JP | 2005-283658 | 10/2005 |
| JP | 2008-301156 | 12/2008 |
| JP | 2009-198539 | 9/2009 |
| JP | 2011-215485 | 10/2011 |
| JP | 2015-059948 | 3/2015 |
| JP | 2018-125819 | 8/2018 |
| JP | 2019-095595 | 6/2019 |

\* cited by examiner

*Primary Examiner* — Brent D Castiaux
(74) *Attorney, Agent, or Firm* — Dority & Manning, P.A.

(57) ABSTRACT

A display method includes, when making a plurality of projectors including a first projector project projection light to display a single image, the steps of trying, by the first projector, to obtain first position information representing the projector corresponding to an installation position of the first projector, judging, by the first projector, whether or not first multi-configuration information corresponding to the first position information is stored when the first position information is obtained, and displaying, by the first projector, a first portion of the single image based on the first multi-configuration information when it is judged that the first multi-configuration information is stored.

6 Claims, 7 Drawing Sheets

| TAG NAME | POSITION INFORMATION | IDENTIFICATION INFORMATION |
|---|---|---|
| FIRST TAG | LEFT SIDE | PJ101 |
| SECOND TAG | CENTER | PJ102 |
| THIRD TAG | RIGHT SIDE | PJ103 |

DISPLAY METHOD AND DISPLAY SYSTEM

The present application is based on, and claims priority from JP Application Serial Number 2020-178718, filed Oct. 26, 2020, the disclosure of which is hereby incorporated by reference herein in its entirety.

BACKGROUND

1. Technical Field

The present disclosure relates to a display method and a display system.

2. Related Art

In the past, there has been known a so-called multi-projection technology of making a plurality of projectors project projection light to thereby display a single image. In JP-A-2019-95595, there is described a communication device which writes multi-projection configuration information in the projectors for performing the multi-projection with near field communication when the projectors are touched in sequence.

However, in the technology described in JP-A-2019-95595, since it is necessary to sequentially touch the projectors for performing the multi-projection, there is a room for improvement in time and effort of the user.

SUMMARY

A display method according to an aspect of an application example includes, when at least a first projector and a second projector project projection light to thereby display a first single image, the steps of trying, by the first projector, to obtain first current position information representing a current installation position of the first projector, trying, by the second projector, to obtain second current position information representing a current installation position of the second projector, judging, by the first projector, whether or not first configuration information corresponding to the first current position information is stored when the first current position information is obtained, judging, by the second projector, whether or not second configuration information corresponding to the second current position information is stored when the second current position information is obtained, displaying, by the first projector, a first portion of the first single image based on the first configuration information when it is judged that the first configuration information is stored, and displaying, by the second projector, a second portion of the first single image based on the second configuration information when it is judged that the second configuration information is stored.

Another aspect of the application example is directed to a display system including a first projector, and a second projector, wherein the first projector and the second projector at least project projection light to thereby display a single image, the first projector includes trying to obtain first current position information representing a current installation position of the first projector, judging whether or not first configuration information corresponding to the first current position information is stored when the first current position information is obtained, and displaying a first portion of the single image based on the first configuration information when it is judged that the first configuration information is stored, and the second projector includes trying to obtain second current position information representing a current installation position of the second projector, judging whether or not second configuration information corresponding to the second current position information is stored when the second current position information is obtained, and displaying a second portion of the single image based on the second configuration information when it is judged that the second configuration information is stored.

DESCRIPTION OF AN EXEMPLARY EMBODIMENT

An embodiment will hereinafter be described with reference to the drawings.

Figure 1:
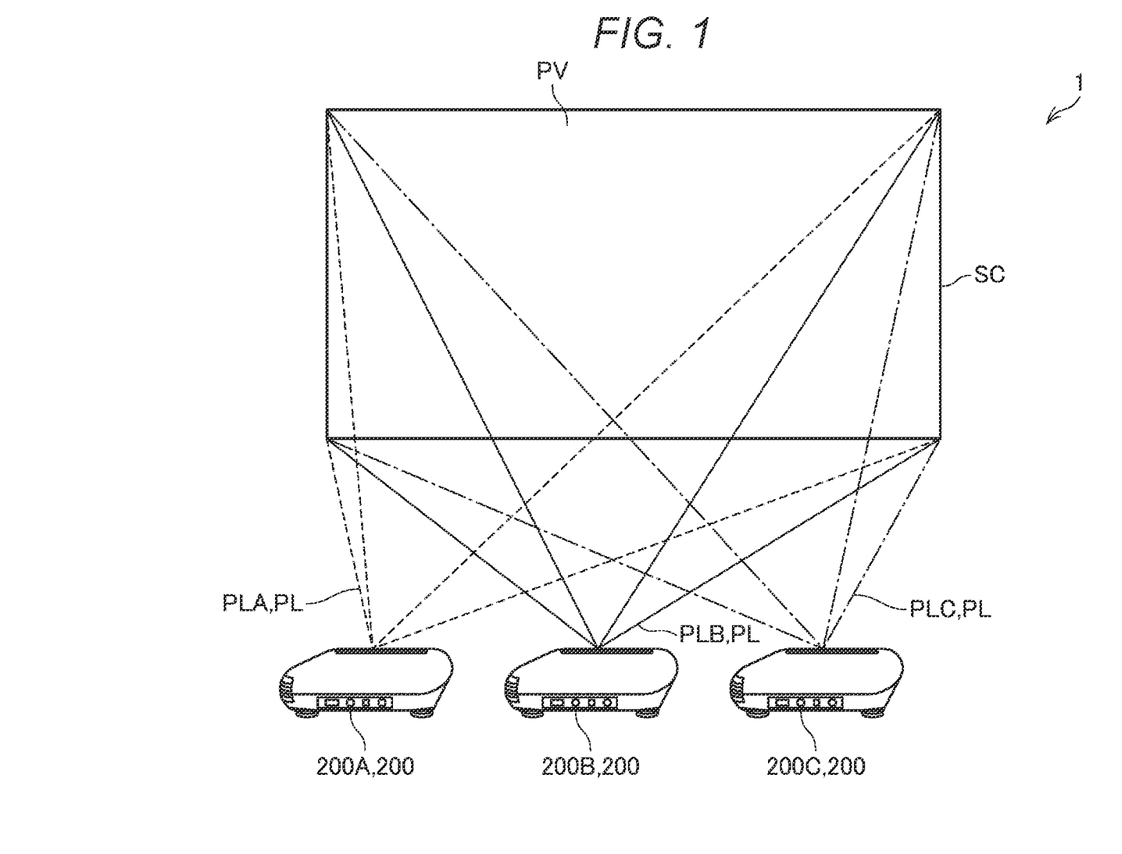
FIG. 1 is a perspective view showing an example of a projection state of an image projection system according to an embodiment.

FIG. 1 is a perspective view showing an example of a projection state of an image projection system 1 according to the present embodiment.

The image projection system 1 is provided with an image supply device 100 and a plurality of projectors 200. In the present embodiment, the image projection system 1 is provided with a first projector 200A, a second projector 200B, and a third projector 200C as the plurality of projectors 200.

The first projector 200A through the third projector 200C have respective configurations substantially the same as each other.

In the following description, the first projector 200A through the third projector 200C are each described as a projector 200 in some cases when it is not particularly required to distinguish these projectors from each other.

The image supply device 100 will be described with reference to FIG. 2.

The image projection system 1 corresponds to an example of a "display system."

As shown in FIG. 1, the first projector 200A through the third projector 200C are arranged in, for example, a horizontal direction. In other words, the first projector 200A through the third projector 200C are arranged along a direction parallel to a screen SC.

The first projector 200A projects an image light beam PLA on the screen SC. The second projector 200B projects an image light beam PLB on the screen SC. The third projector 200C projects an image light beam PLC on the screen SC.

Further, the first projector 200A through the third projector 200C respectively project the image light beam PLA through the image light beam PLC so that the image light beam PLA through the image light beam PLC are superimposed on each other on the screen SC.

In other words, the first projector 200A through the third projector 200C perform so-called "stack projection" to display a single image PV.

The single image PV corresponds to an example of a "first single image."

Further, the image light beam PLA, the image light beam PLB, and the image light beam PLC are each described as an image light beam PL in some cases when these image light beams are not distinguished from each other.

Figure 2:
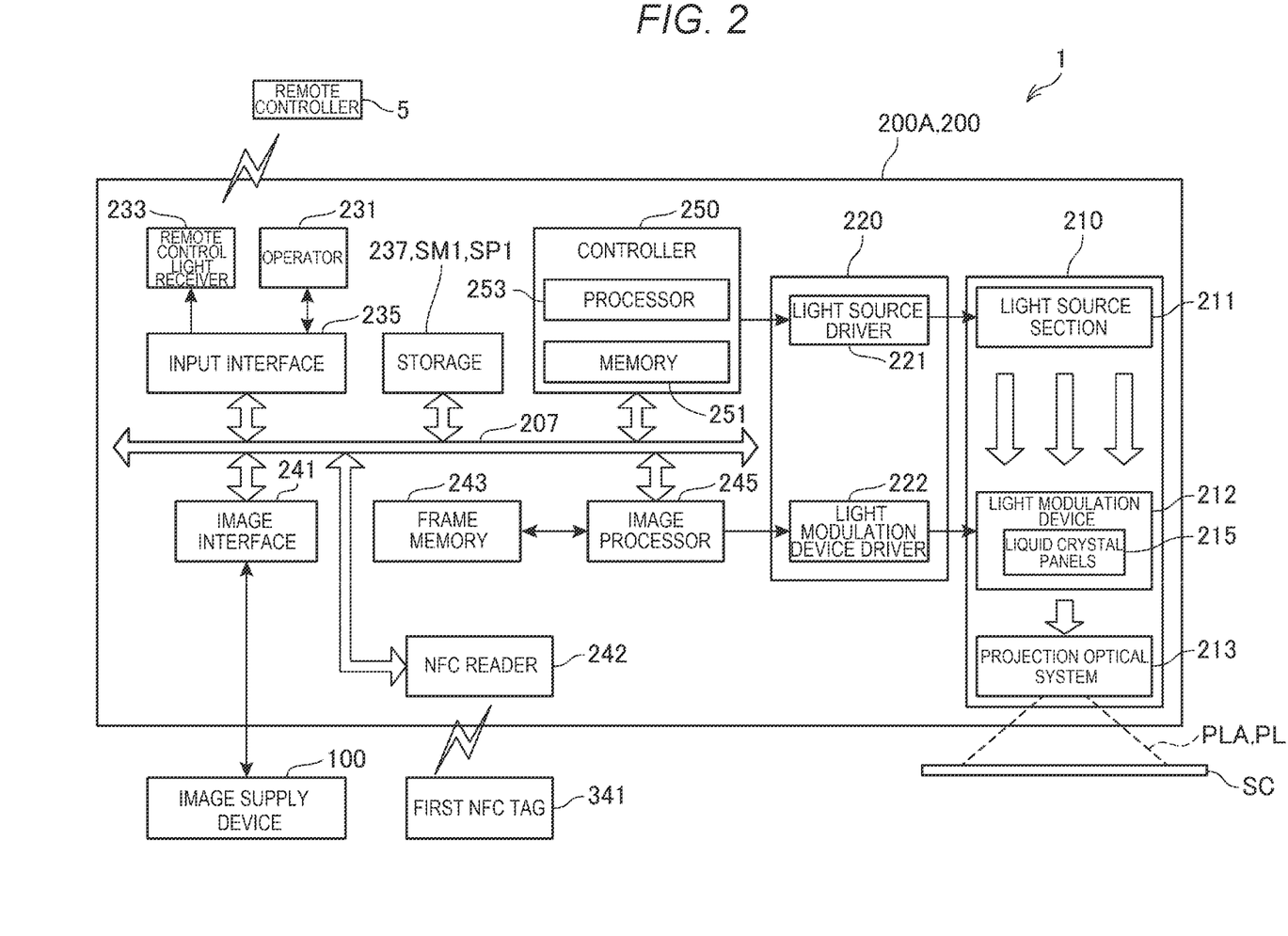
FIG. 2 is a diagram showing an example of a configuration of a first projector according to the embodiment.

FIG. 2 is a diagram showing an example of a configuration of the first projector 200A according to the present embodiment.

Since the first projector 200A through the third projector 200C have respective configurations substantially the same as each other, the configuration of the first projector 200A will be described with reference to FIG. 2, and the description of the configurations of the second projector 200B and the third projector 200C will be omitted.

The image supply device 100 performs communication with each of the first projector 200A through the third projector 200C in compliance with, for example, the Ethernet (a registered trademark) standard.

Further, the image supply device 100 supplies each of the first projector 200A through the third projector 200C with image data. The image supply device 100 supplies each of the first projector 200A through the third projector 200C with, for example, the image data corresponding to an image which is generated by reproducing a content.

As shown in FIG. 2, the first projector 200A is provided with a projector 210 and a driver 220 for driving the projector 210. The projector 210 performs formation of an optical image to project the image on the screen SC. It should be noted that in the present embodiment, the projector 210 projects a projection image corresponding to the image data from the image supply device 100 on the screen SC.

The projector 210 is provided with a light source section 211, a light modulation device 212, and a projection optical system 213. The driver 220 is provided with a light source driver 221 and a light modulation device driver 222.

The light source section 211 is provided with a lamp light source such as a halogen lamp, a xenon lamp, or a super-high-pressure mercury lamp, or a solid-state light source such as an LED (Light Emitting Diode) or a laser source.

Further, the light source section 211 can also be provided with a reflector for guiding the light emitted by the light source to the light modulation device 212, and an auxiliary reflector. Further, the light source section 211 can also be provided with a lens group for improving optical characteristics of the projection light, a polarization plate, a dimming element for reducing a light intensity of the light emitted by the light source on a path leading to the light modulation device 212, or the like.

The light source driver 221 is coupled to an internal bus 207, and puts the light source of the light source section 211 on and off in accordance with an instruction of a controller 250 also coupled to the internal bus 207.

The light modulation device 212 is provided with three liquid crystal panels 215 corresponding respectively to, for example, the three primary colors of R, G, and B. The character R represents red, the character G represents green, and the character B represents blue. In other words, the light modulation device 212 is provided with the liquid crystal panel 215 corresponding to the R colored light, the liquid crystal panel 215 corresponding to the G colored light, and the liquid crystal panel 215 corresponding to the B colored light.

The light emitted by the light source section 211 is separated into colored light beams of the three colors of RGB, and the colored light beams respectively enter the corresponding liquid crystal panels 215. The three liquid crystal panels 215 are each a transmissive liquid crystal panel, and each modulate the light transmitted therethrough to generate the image light beam PLA. The image light beams PLA having been modulated while passing through the respective liquid crystal panels 215 are combined with each other by a combining optical system such as a cross dichroic prism, and the result is emitted to the projection optical system 213.

A case when the light modulation device 212 is provided with the liquid crystal panels 215 of the transmissive type as the light modulation elements will be described in the present embodiment, but the case is not a limitation. The light modulation element can be a reflective liquid crystal panel, or can also be a digital micromirror device (Digital Micromirror Device).

The light modulation device 212 is driven by the light modulation device driver 222. The light modulation device driver 222 is coupled to an image processor 245.

To the light modulation device driver 222, there is input image data corresponding to the respective primary colors of R, G, and B from the image processor 245. The light modulation device driver 222 converts the image data input thereto into data signals suitable for the operations of the liquid crystal panels 215. The light modulation device driver 222 applies a voltage to each pixel of each of the liquid crystal panels 215 based on the data signal thus converted to thereby draw an image on each of the liquid crystal panels 215.

The projection optical system 213 is provided with a lens, a mirror, or the like for focusing the image light beam PLA having entered the projection optical system 213 on the screen SC. Further, the projection optical system 213 can also be provided with a zoom mechanism for expanding or contracting the image to be projected on the screen SC, a focus adjustment mechanism for performing an adjustment of the focus, and so on.

The first projector 200A is further provided with an operator 231, a remote control light receiver 233, an input interface 235, a storage 237, an image interface 241, an NFC (Near Field Communication) reader 242, a frame memory 243, the image processor 245, and the controller 250. The input interface 235, the storage 237, the image interface 241, the NFC reader 242, the image processor 245, and the controller 250 are coupled to each other so as to be able to achieve data communication with each other via the internal bus 207.

The operator 231 is provided with a variety of buttons and switches disposed on a surface of a chassis of the first projector 200A, and generates an operation signal corresponding to an operation to these buttons and switches to output the operation signal to the input interface 235. The input interface 235 is provided with a circuit for outputting the operation signal input from the operator 231 to the controller 250.

The remote control light receiver 233 receives an infrared signal transmitted from a remote controller 5, and then decodes the infrared signal thus received to generate the operation signal. The remote control light receiver 233 outputs the operation signal thus generated to the input interface 235. The input interface 235 is provided with a circuit for outputting the operation signal input from the remote control light receiver 233 to the controller 250.

The storage 237 is a magnetic recording device such as an HDD (Hard Disk Drive), or a storage device using a semiconductor storage element such as a flash memory. The storage 237 stores a program to be executed by the controller 250, data having been processed by the controller 250, the image data, and so on.

Further, the storage 237 stores first multi-configuration information SM1 and first individual configuration information SP1. The storage 237 stores the first multi-configuration information SM1 so as to correspond to first position information PS1 and first identification information DT1.

The first position information PS1 and the first identification information DT1 will be described with reference to FIG. 3 and FIG. 4.

The first multi-configuration information SM1 represents configuration information set to the first projector 200A when the images respectively projected by the first projector 200A through the third projector 200C are superimposed on each other. The first multi-configuration information SM1 sets a position of the image to be projected by the first projector 200A so that, for example, the images respectively projected by the first projector 200A through the third projector 200C are superimposed on each other. Further, the first multi-configuration information SM1 sets the position, a color tone, and a luminance of the image to be projected by the first projector 200A so that a superimposed image which is formed by superimposing the images respectively projected by the first projector 200A through the third projector 200C on each other, namely an image PV, has a desired color tone and a desired luminance.

Further, the following processing is executed in advance to thereby determine the first multi-configuration information SM1, and then store the first multi-configuration information SM1 in the storage 237.

Figure 3:
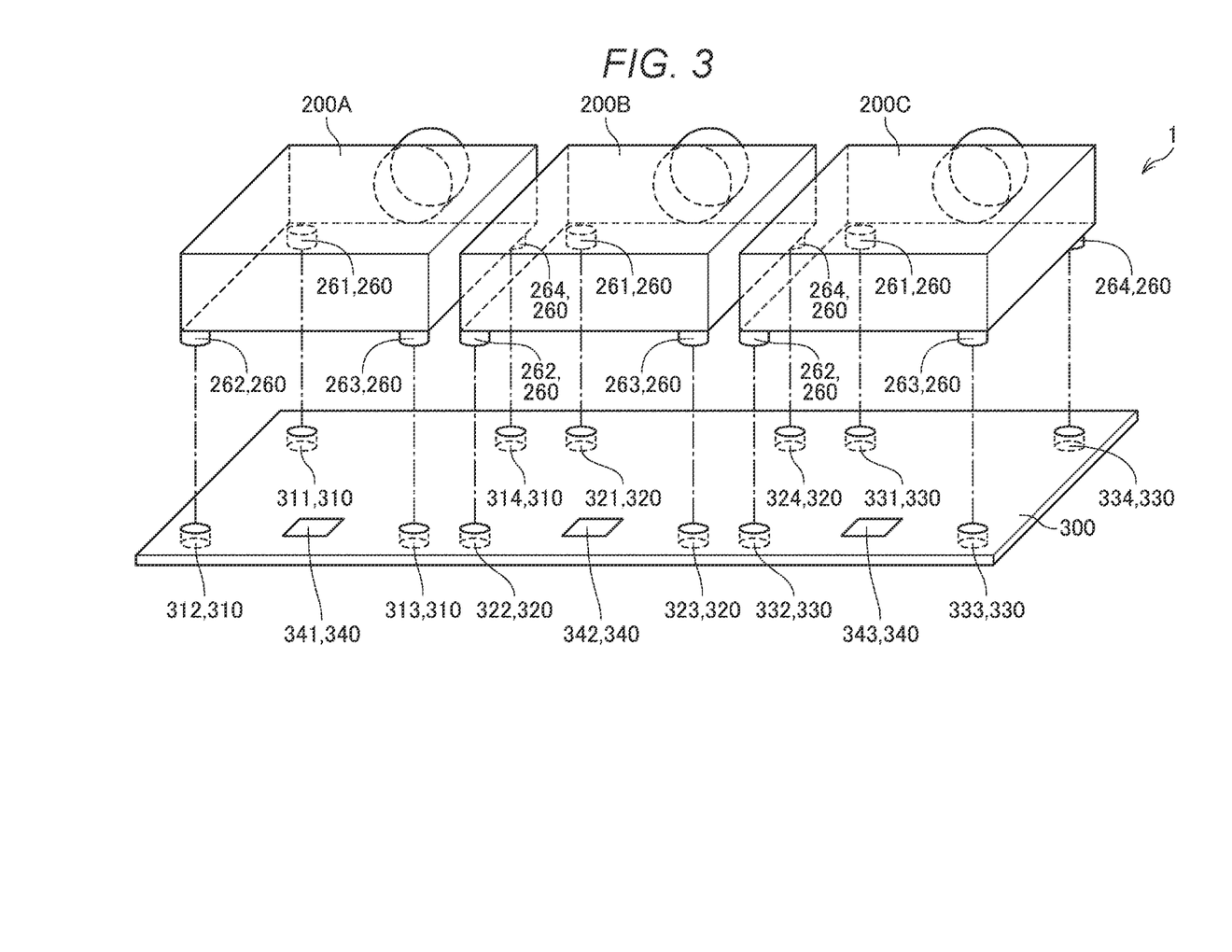
FIG. 3 is a diagram showing an example of a configuration of a mounting member related to the embodiment.

Specifically, the color tone and the luminance of the image to be projected by each of the first projector 200A through the third projector 200C are adjusted so that the superimposed image formed by superimposing the images respectively projected by the first projector 200A through the third projector 200C on each other, namely the image PV, has the desired color tone and the desired luminance in a state in which, for example, the first projector 200A through the third projector 200C are respectively fixed to the first fixators 310 through the third fixators 330 of a mounting member 300 shown in FIG. 3.

Further, a projection condition of the first projector 200A representing an adjustment result is stored in the storage 237 of the first projector 200A as the first multi-configuration information SM1. On this occasion, it is possible to make the first position information PS1 and the first identification information DT1 correspond to the first multi-configuration information SM1 by inputting the first position information PS1 and the first identification information DT1 via, for example, the input interface 235. Further, on this occasion, the first position information PS1 and the first identification information DT1 the same as those stored in the first projector 200A are written into a first NFC tag 341. Similarly, a projection condition of the second projector 200B representing an adjustment result is stored in the storage 237 of the second projector 200B as second multi-configuration information SM2, and a projection condition of the third projector 200C representing an adjustment result is stored in the storage 237 of the third projector 200C as third multi-configuration information SM3.

The first multi-configuration information SM1 corresponds to an example of "first configuration information."

The first individual configuration information SP1 represents configuration information when the first projector 200A alone displays a single image.

The single image displayed by the first projector 200A alone corresponds to an example of a "second single image."

In a similar manner, the storage 237 of the second projector 200B stores the second multi-configuration information SM2 and second individual configuration information SP2. The storage 237 of the second projector 200B stores the second multi-configuration information SM2 so as to correspond to second position information PS2 and second identification information DT2.

Further, the storage 237 of the third projector 200C stores the third multi-configuration information SM3 and third individual configuration information SP3. The storage 237 of the third projector 200C stores the third multi-configuration information SM3 so as to correspond to third position information PS3 and third identification information DT3.

It should be noted that the second multi-configuration information SM2 stored by the storage 237 of the second projector 200B corresponds to an example of "second configuration information."

The second individual configuration information SP2 represents configuration information when the second projector 200B alone displays a single image.

The single image displayed by the second projector 200B alone corresponds to an example of the "second single image."

The second position information PS2, the second identification information DT2, the third position information PS3, and the third identification information DT3 will be described with reference to FIG. 3 and FIG. 4.

The image interface 241 is provided with a connector and an interface circuit, and is configured to be able to be coupled with wire to the image supply device 100 for supplying the first projector 200A with the image data. The image interface 241 is, for example, a communication interface for performing communication with the image supply device 100 in compliance with the Ethernet (the registered trademark) standard. The image interface 241 receives the image data from the image supply device 100.

The NFC reader 242 retrieves the first position information PS1 and the first identification information DT1 from the first NFC tag 341 in accordance with an instruction from the controller 250.

The first NFC tag 341 will be described with reference to FIG. 3. The first position information PS1 and the first identification information DT1 will be described with reference to FIG. 3 and FIG. 4.

The controller 250 is provided with a memory 251 and a processor 253.

The memory 251 is a storage device for storing programs and data to be executed by the processor 253 in a nonvolatile manner. The memory 251 is formed of a magnetic storage device, a semiconductor storage element such as a flash ROM (Read Only Memory), or other types of nonvolatile storage device. Further, the memory 251 can also include a RAM (Random Access Memory) constituting a work area for the processor 253. The memory 251 stores the data to be processed by the controller 250, and a control program to be executed by the processor 253.

The processor 253 can be formed of a single processor, or it is also possible to adopt a configuration in which a plurality of processors functions as the processor 253. The processor 253 executes the control program to control each section of the first projector 200A.

For example, an execution instruction of the image processing corresponding to the operation received by the operator 231 or the remote controller 5, and parameters used in the image processing are output by the processor 253 to the image processor 245. The parameters include, for example, geometric correction parameters for correcting a geometric distortion of the image to be projected on the screen SC.

The image processor 245 and the frame memory 243 can each be formed of, for example, an integrated circuit. The integrated circuit includes an LSI (Large Scale Integration), an ASIC (Application Specific Integrated Circuit), and a PLD (Programmable Logic Device). The PLD includes, for example, an FPGA (Field-Programmable Gate Array). Further, it is also possible for an analog circuit to be included in a part of a configuration of the integrated circuit, or it is also possible to adopt a combination of the processor and the integrated circuit. The combination of the processor and the integrated circuit is called a micro-controller (MCU), an SoC (System-on-a-chip), a system LSI, a chip set, and so on.

The image data input from the image interface 241 to the image processor 245 is developed in the frame memory 243 by the image processor 245. The frame memory 243 is provided with a plurality of banks. Each of the banks has a storage capacity sufficient for writing the image data corresponding to one frame. The frame memory 243 is formed of, for example, an SDRAM (Synchronous Dynamic Random Access Memory).

The image processor 245 performs image processing such as a resolution conversion process or a resizing process, correction of a distortion aberration, a shape correction process, a digital zooming process, and an adjustment of tint and luminance of the image on the image data developed in the frame memory 243.

Further, the image processor 245 generates a vertical sync signal obtained by converting the input frame frequency of the vertical sync signal into the drawing frequency. The vertical sync signal thus generated is referred to as an output sync signal. The image processor 245 outputs the output sync signal thus generated to the light modulation device driver 222.

The processing of the processor 253 is different between the first projector 200A through the third projector 200C. Therefore, each of the processing of the processor 253 of the first projector 200A, the processing of the processor 253 of the second projector 200B, and the processing of the processor 253 of the third projector 200C will be described below.

First, the processing of the processor 253 of the first projector 200A will be described.

The processor 253 of the first projector 200A tries to obtain first current position information representing a current installation position of the first projector 200A using the NFC reader 242. Specifically, when the first projector 200A is disposed at a position where the first projector 200A is capable of communicating with the first NFC tag 341, the processor 253 of the first projector 200A tries to obtain the first position information PS1 representing the installation position of the first projector 200A from the first NFC tag 341. When the first position information PS1 is stored in the first NFC tag 341, the first position information PS1 is obtained as the first current position information.

The first position information PS1 corresponds to an example of "first current position information."

The processor 253 of the first projector 200A tries to obtain first individual information representing a projector corresponding to the current installation position of the first projector 200A using the NFC reader 242. Specifically, when the first projector 200A is disposed at a position where the first projector 200A is capable of communicating with the first NFC tag 341, the processor 253 of the first projector 200A tries to obtain the first identification information DT1 for identifying the first projector 200A from the first NFC tag 341. When the first identification information DT1 is stored in the first NFC tag 341, the first identification information DT1 is obtained as the first individual information.

The first identification information DT1 corresponds to an example of "first individual information."

When at least one of the first current position information and the first individual information fails to be obtained, the processor 253 of the first projector 200A displays a single image based on the first individual configuration information SP1 as the configuration information when displaying the single image by the first projector 200A alone.

When the first current position information and the first individual information are obtained, the processor 253 of the first projector 200A judges whether or not the first configuration information corresponding to the first current position information and the first individual information is stored. Specifically, when the first position information PS1 and the first identification information DT1 are obtained, since the first multi-configuration information SM1 made to correspond to the first identification information DT1 is stored in the memory 251, the processor 253 of the first projector 200A judges that the first configuration information is stored. When the first current position information and the first individual information are not the first position information PS1 and the first identification information DT1, since the corresponding configuration information is not stored, the processor 253 of the first projector 200A judges that the first configuration information is not stored.

When the processor 253 of the first projector 200A has judged that the first multi-configuration information SM1 is stored, the processor 253 of the first projector 200A displays a first portion of the single image PV based on the first multi-configuration information SM1. The first portion corresponds to a part of the luminance of the image PV.

When the processor 253 of the first projector 200A has judged that the first configuration information is not stored, the processor 253 of the first projector 200A gives notice that the installation position of the first projector 200A is not an appropriate position.

The first NFC tag 341, the first position information PS1, and the first identification information DT1 will be described with reference to FIG. 3 and FIG. 4.

Then, the processing of the processor 253 of the second projector 200B will be described.

The processor 253 of the second projector 200B tries to obtain first current position information representing a current installation position of the second projector 200B using the NFC reader 242. Specifically, when the second projector 200B is disposed at a position where the second projector 200B is capable of communicating with a second NFC tag 342, the processor 253 of the second projector 200B tries to obtain the second position information PS2 representing the installation position of the second projector 200B from the second NFC tag 342. When the second position information PS2 is stored in the second NFC tag 342, the second position information PS2 is obtained as the first current position information.

The second position information PS2 corresponds to an example of "second current position information."

The processor 253 of the second projector 200B tries to obtain the first individual information representing a projector corresponding to the current installation position of the first projector 200A using the NFC reader 242. Specifically, when the second projector 200B is disposed at a position where the second projector 200B is capable of communicating with the second NFC tag 342, the processor 253 of the second projector 200B tries to obtain the second identification information DT2 for identifying the second projector 200B from the second NFC tag 342. When the second identification information DT2 is stored in the second NFC tag 342, the second identification information DT2 is obtained as the first individual information.

The second identification information DT2 corresponds to an example of "second individual information."

When at least one of the second current position information and the second individual information fails to be obtained, the processor 253 of the second projector 200B displays a single image based on the second individual configuration information SP2 as the configuration information when displaying the single image by the second projector 200B alone.

When the second current position information and the second individual information are obtained, the processor 253 of the second projector 200B judges whether or not the second configuration information corresponding to the second current position information and the second individual information is stored. Specifically, when the second position information PS2 and the second identification information DT2 are obtained, the processor 253 of the second projector 200B judges whether or not the second multi-configuration information SM2 corresponding to the second position information PS2 and the second identification information DT2 is stored. When the second position information PS2 and the second identification information DT2 are obtained, since the second multi-configuration information SM2 made to correspond to the second identification information DT2 is stored in the memory 251, the processor 253 of the second projector 200B judges that the second configuration information is stored. When the second current position information and the second individual information are not the second position information PS2 and the second identification information DT2, since the corresponding configuration information is not stored, the processor 253 of the second projector 200B judges that the second configuration information is not stored.

When the processor 253 of the second projector 200B judges that the second multi-configuration information SM2 is stored, the processor 253 of the second projector 200B displays a second portion of the single image PV based on the second multi-configuration information SM2. The second portion corresponds to a part of the luminance of the image PV.

When the processor 253 of the second projector 200B judges that the second multi-configuration information SM2 is not stored, the processor 253 of the second projector 200B gives notice that the installation position of the second projector 200B is not an appropriate position.

The second NFC tag 342, the second position information PS2, and the second identification information DT2 will be described with reference to FIG. 3 and FIG. 4.

Then, the processing of the processor 253 of the third projector 200C will be described.

The processor 253 of the third projector 200C tries to obtain third position information PS3 representing an installation position of the third projector 200C from a third NFC tag 343 using the NFC reader 242.

The processor 253 of the third projector 200C tries to obtain third identification information DT3 for identifying the third projector 200C from the third NFC tag 343 using the NFC reader 242.

When at least one of the third position information PS3 and the third identification information DT3 fails to be obtained, the processor 253 of the third projector 200C displays a single image based on the third individual configuration information SP3 as the configuration information when displaying the single image by the third projector 200C alone.

When the third position information PS3 and the third identification information DT3 are obtained, the processor 253 of the third projector 200C judges whether or not the third multi-configuration information SM3 corresponding to the third position information PS3 and the third identification information DT3 is stored.

When the processor 253 of the third projector 200C has judged that the third multi-configuration information SM3 is stored, the processor 253 of the third projector 200C displays a third portion of the single image PV based on the third multi-configuration information SM3. The third portion corresponds to a part of the luminance of the image PV. Further, the third portion corresponds to the remnant of the luminance of the image PV except the first portion and the second portion.

When the processor 253 of the third projector 200C judges that the third multi-configuration information SM3 is not stored, the processor 253 of the third projector 200C gives notice that the installation position of the third projector 200C is not an appropriate position.

The third NFC tag 343, the third position information PS3, and the third identification information DT3 will be described with reference to FIG. 3 and FIG. 4.

It should be noted that when the first position information PS1 through the third position information PS3 are not distinguished from each other, the first position information PS1 through the third position information PS3 are described as position information PS in some cases in the following description. Further, when the first identification information DT1 through the third identification information DT3 are not distinguished from each other, the first identification information DT1 through the third identification information DT3 are described as identification information DT in some cases in the following description.

FIG. 3 is a diagram showing an example of a configuration of a mounting member 300 related to the present embodiment.

The image projection system 1 is provided with the mounting member 300 in addition to the image supply device 100 and the projectors 200 described above with reference to FIG. 1 and FIG. 2.

On the mounting member 300, there is mounted each of the first projector 200A through the third projector 200C. The mounting member 300 is formed to have a shape like a flat plate. The mounting member 300 is fixed horizontally to a desk or the like disposed in a meeting room or the like. The mounting member 300 is formed of timber, or metal such as aluminum or stainless steel.

The mounting member 300 is provided with a first fixator 310, a second fixator 320, and a third fixator 330. The first fixator 310 detachably fixes the first projector 200A. The second fixator 320 detachably fixes the second projector 200B. The third fixator 330 detachably fixes the third projector 200C.

Each of the first projector 200A through the third projector 200C is provided with legs 260 formed so as to protrude downward from a chassis. The legs 260 are each formed of resin or the like. The legs 260 are constituted by a first leg 261, a second leg 262, a third leg 263, and a fourth leg 264.

Each of the first leg 261 through the fourth leg 264 is formed of resin or the like to have a columnar shape.

The first fixator 310 is provided with a first hole 311, a second hole 312, a third hole 313, and a fourth hole 314. Each of the first hole 311 through the fourth hole 314 is provided with a hole having a cylindrical shape. The diameter of the hole provided to each of the first hole 311 through the fourth hole 314 is slightly larger than the diameter of each of the first leg 261 through the fourth leg 264.

By the first leg 261 through the fourth leg 264 of the first projector 200A respectively fitting into the first hole 311 through the fourth hole 314, the first projector 200A is fixed to the first fixator 310. By lifting the chassis of the first projector 200A upward, the first projector 200A is detached from the first fixator 310.

The second fixator 320 is provided with a first hole 321 through a fourth hole 324. By the first leg 261 through the fourth leg 264 of the second projector 200B respectively fitting into the first hole 321 through the fourth hole 324 of the second fixator 320, the second projector 200B is fixed to the second fixator 320. By lifting the chassis of the second projector 200B upward, the second projector 200B is detached from the second fixator 320.

The third fixator 330 is provided with a first hole 331 through a fourth hole 334. By the first leg 261 through the fourth leg 264 of the third projector 200C respectively fitting into the first hole 331 through the fourth hole 334 of the third fixator 330, the third projector 200C is fixed to the third fixator 330. By lifting the chassis of the third projector 200C upward, the third projector 200C is detached from the third fixator 330.

The mounting member 300 is further provided with an NFC tag 340. The NFC tag 340 is disposed on an upper surface of the mounting member 300. The NFC tag 340 includes the first NFC tag 341, the second NFC tag 342, and the third NFC tag 343. When the first NFC tag 341, the second NFC tag 342, and the third NFC tag 343 are not distinguished from each other, the first NFC tag 341, the second NFC tag 342, and the third NFC tag 343 are described as the NFC tags 340 in some cases in the following description.

The first NFC tag 341 is disposed on the upper surface of the mounting member 300 so as to be close to the NFC reader 242 of the first projector 200A when the first projector 200A is fixed to the first fixator 310. For example, the first NFC tag 341 is disposed at a position where the first NFC tag 341 is opposed to the NFC reader 242 of the first projector 200A fixed to the first fixator 310.

The first NFC tag 341 stores the first position information PS1 and the first identification information DT1. When the first projector 200A is fixed to the first fixator 310, the NFC reader 242 of the first projector 200A retrieves the first position information PS1 and the first identification information DT1 from the first NFC tag 341. In contrast, each of the NFC reader 242 of the second projector 200B fixed to the second fixator 320 and the NFC reader 242 of the third projector 200C fixed to the third fixator 330 exceeds a readable range of the NRC reader 242 when the first projector 200A is fixed to the first fixator 310, and therefore cannot retrieve the first position information PS1 and the first identification information DT1 from the first NFC tag 341.

The first NFC tag 341 corresponds to an example of a "first memory."

The second NFC tag 342 is disposed on the upper surface of the mounting member 300 so as to be close to the NFC reader 242 of the second projector 200B when the second projector 200B is fixed to the second fixator 320. For example, the second NFC tag 342 is disposed at a position where the second NFC tag 342 is opposed to the NFC reader 242 of the second projector 200B fixed to the second fixator 320.

The second NFC tag 342 stores the second position information PS2 and the second identification information DT2. When the second projector 200B is fixed to the second fixator 320, the NFC reader 242 of the second projector 200B retrieves the second position information PS2 and the second identification information DT2 from the second NFC tag 342. In contrast, each of the NFC reader 242 of the first projector 200A fixed to the first fixator 310 and the NFC reader 242 of the third projector 200C fixed to the third fixator 330 exceeds the readable range of the NRC reader 242 when the second projector 200B is fixed to the second fixator 320, and therefore cannot retrieve the second position information PS2 and the second identification information DT2 from the second NFC tag 342.

The second NFC tag 342 corresponds to an example of a "second memory."

The third NFC tag 343 is disposed on the upper surface of the mounting member 300 so as to be close to the NFC reader 242 of the third projector 200C when the third projector 200C is fixed to the third fixator 330. For example, the third NFC tag 343 is disposed at a position where the third NFC tag 343 is opposed to the NFC reader 242 of the third projector 200C fixed to the third fixator 330.

The third NFC tag 343 stores the third position information PS3 and the third identification information DT3. When the third projector 200C is fixed to the third fixator 330, the NFC reader 242 of the third projector 200C retrieves the third position information PS3 and the third identification information DT3 from the third NFC tag 343. In contrast, each of the NFC reader 242 of the first projector 200A fixed to the first fixator 310 and the NFC reader 242 of the second projector 200B fixed to the second fixator 320 exceeds the readable range of the NRC reader 242 when the third projector 200C is fixed to the third fixator 330, and therefore cannot retrieve the third position information PS3 and the third identification information DT3 from the third NFC tag 343.

In the present embodiment, there is described a case where each of the first hole 311 through the fourth hole 314, the first hole 321 through the fourth hole 324, and the first hole 331 through the fourth hole 334 is formed to have the columnar shape, but this is not a limitation. It is possible for each of the first hole 311 through the fourth hole 314, the first hole 321 through the fourth hole 324, and the first hole 331 through the fourth hole 334 to be formed to have an inverted circular truncated conical shape. In this case, it becomes easy to attach and detach the first projector 200A through the third projector 200C to and from the first fixator 310 through the third fixator 330.

Further, in the present embodiment, there is described a case where each of the first leg 261 through the fourth leg 264 of the first projector 200A through the third projector 200C is formed to have the columnar shape, but this is not a limitation. It is possible for each of the first leg 261 through the fourth leg 264 of the first projector 200A through the third projector 200C to be formed to have an inverted circular truncated conical shape. In this case, it becomes easy to attach and detach the first projector 200A through the third projector 200C to and from the first fixator 310 through the third fixator 330.

Figure 4:
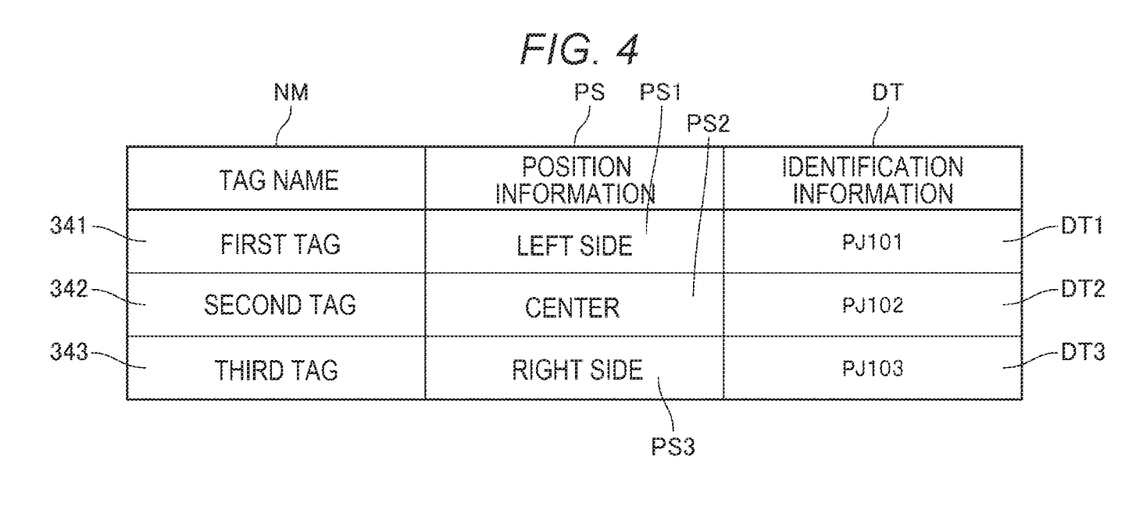
FIG. 4 is a chart showing an example of position information and identification information stored by an NFC tag.

FIG. 4 is a chart showing an example of the position information PS and the identification information DT stored by the NFC tags 340.

In the left side fields in FIG. 4, there is described an example of names NM representing the names of the NFC tags 340, in the central fields in FIG. 4, there is described an example of the position information PS of the NFC tags 340, and in the right side fields in FIG. 4, there is described an example of the identification information DT of the NFC tags 340.

Each of the first NFC tag 341 through the third NFC tag 343 stores the tag name NM, the position information PS, and the identification information DT so as to correspond to each other.

For example, the first NFC tag 341 stores a "FIRST TAG" as the tag name NM, stores "LEFT SIDE" as the first position information PS1, and stores "PJ101" as the first identification information DT1.

The first position information PS1 represents the fact that the first NFC tag 341 is disposed at the "LEFT SIDE" of the mounting member 300. The first identification information DT1 represents the identification information of the first projector 200A to be disposed at the position corresponding to the first NFC tag 341.

Further, for example, the second NFC tag 342 stores a "SECOND TAG" as the tag name NM, stores "CENTER" as the second position information PS2, and stores "PJ102" as the second identification information DT2.

The second position information PS2 represents the fact that the second NFC tag 342 is disposed at the "CENTER" of the mounting member 300. The second identification information DT2 represents the identification information of the second projector 200B to be disposed at the position corresponding to the second NFC tag 342.

Further, for example, the third NFC tag 343 stores a "THIRD TAG" as the tag name NM, stores "RIGHT SIDE" as the third position information PS3, and stores "PJ103" as the third identification information DT3.

The third position information PS3 represents the fact that the third NFC tag 343 is disposed at the "RIGHT SIDE" of the mounting member 300. The third identification information DT3 represents the identification information of the third projector 200C to be disposed at the position corresponding to the third NFC tag 343.

In the present embodiment, there is described a case where each of the first NFC tag 341 through the third NFC tag 343 stores the tag name NM, the position information PS, and the identification information DT so as to correspond to each other, but it is sufficient for each of the first NFC tag 341 through the third NFC tag 343 to store the position information PS and the identification information DT so as to correspond to each other. For example, it is possible for each of the first NFC tag 341 through the third NFC tag 343 to store the identification information of the NFC tag, the position information PS, and the identification information DT so as to correspond to each other.

Then, the processing of each of the processors 253 of the first projector 200A through the third projector 200C will be described with reference to FIG. 5 through FIG. 7.

Figure 5:
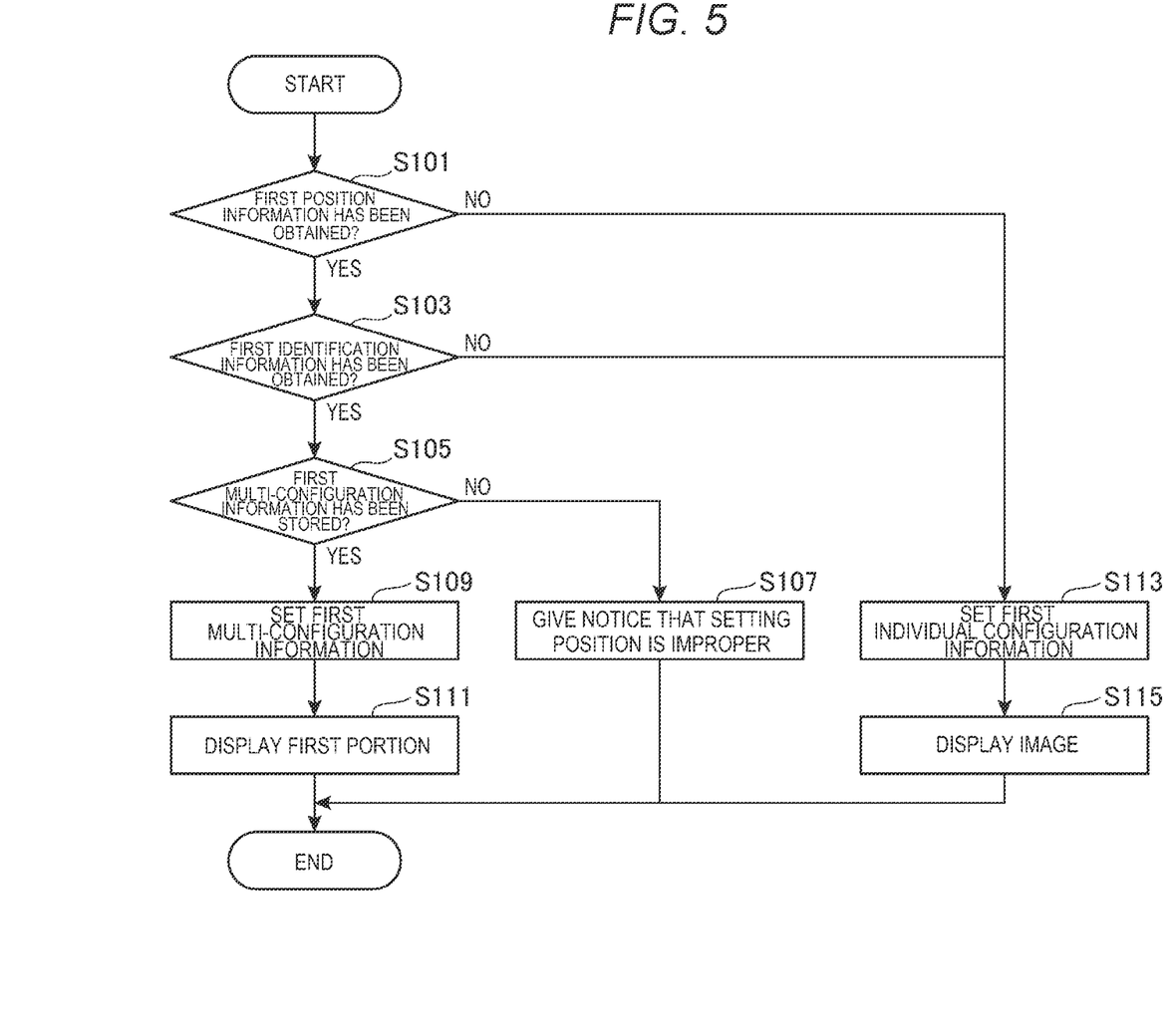
FIG. 5 is a diagram showing an example of processing of a processor of the first projector.

FIG. 5 is a diagram showing an example of the processing of the processor 253 of the first projector 200A. It should be noted that in the description of FIG. 5, the processor 253 of the first projector 200A is described as the processor 253 for the sake of convenience.

As shown in FIG. 5, in the step S101, the processor 253 judges whether or not the first position information PS1 has been obtained from the first NFC tag 341.

When the processor 253 judges that the first position information PS1 has not been obtained from the first NFC tag 341 (NO in the step S101), the process proceeds to the step S113. When the processor 253 judges that the first position information PS1 has been obtained from the first NFC tag 341 (YES in the step S101), the process proceeds to the step S103.

Then, in the step S103, the processor 253 judges whether or not the first identification information DT1 has been obtained from the first NFC tag 341.

When the processor 253 judges that the first identification information DT1 has not been obtained from the first NFC tag 341 (NO in the step S103), the process proceeds to the step S113. When the processor 253 judges that the first identification information DT1 has been obtained from the first NFC tag 341 (YES in the step S103), the process proceeds to the step S105.

Then, in the step S105, the processor 253 judges whether or not the storage 237 of the first projector 200A has stored the first multi-configuration information SM1.

When the processor 253 judges that the storage 237 of the first projector 200A has not stored the first multi-configuration information SM1 (NO in the step S105), the process proceeds to the step S107.

Then, in the step S107, the processor 253 gives notice that the installation position of the first projector 200A is inappropriate. For example, the processor 253 displays OSD (On-Screen Display) representing the fact that the installation position of the first projector 200A is inappropriate on the screen SC. Subsequently, the process is terminated.

When the processor 253 judges that the storage 237 of the first projector 200A has stored the first multi-configuration information SM1 (YES in the step S105), the process proceeds to the step S109.

Then, in the step S109, the processor 253 sets the first multi-configuration information SM1 as a projection condition of the first projector 200A.

Then, in the step S111, the processor 253 displays the first portion of the single image PV based on the first multi-configuration information SM1. Subsequently, the process is terminated.

In the case of NO in the step S101, or in the case of NO in the step S103, the processor 253 sets the first individual configuration information SP1 as the projection condition of the first projector 200A in the step S113.

Then, in the step S115, the processor 253 displays an image based on the first individual configuration information SP1. Subsequently, the process is terminated.

The step S101 and the step S103 correspond to an example of a "first acquisition step." The step S105 corresponds to an example of a "first judgment step." A pair of the step S109 and the step S111, and a pair of the step S113 and the step S115 correspond to an example of a "first display step." The step S107 corresponds to an example of a "first notification step."

As described above, when it is judged that the storage 237 of the first projector 200A has not stored the first multi-configuration information SM1, the processor 253 gives notice that the installation position of the first projector 200A is inappropriate. The fact that the first configuration information corresponding to the first current position information and the first individual information is not stored means that the first current position information and the first individual information do not coincide with the first position information PS1 and the first identification information DT1 stored in the storage 237, namely the installation position of the first projector 200A is not correct. Therefore, due to the notification, it is possible for the user to easily recognize the fact that the installation position of the first projector 200A is inappropriate. Therefore, it is possible to enhance the convenience of the user.

Further, when it is judged that the first position information PS1 and the first identification information DT1 are obtained, and the first multi-configuration information SM1 of the first projector 200A is stored, the first projector 200A displays the first portion of the single image PV based on the first multi-configuration information SM1. Therefore, when the first projector 200A is disposed on the mounting member 300, it is possible to easily make the first projector 200A display the first portion of the single image PV.

Further, when at least one of the first position information PS1 and the first identification information DT1 fails to be obtained, the processor 253 displays the single image based on the first individual configuration information SP1 as the configuration information when displaying the single image by the first projector 200A alone. The fact that one of the first current position information and the first individual information fails to be obtained means that one of the first position information PS1 and the first identification information DT1 is not stored in the first NFC tag 341, or the first NFC tag 341 is not located at the position where the first projector 200A can read the first NFC tag 341. Therefore, it is possible to easily make the first projector 200A display the single image by itself when the first projector 200A is detached from the mounting member 300, or when the setting for the multi-projection has not been made.

Figure 6:
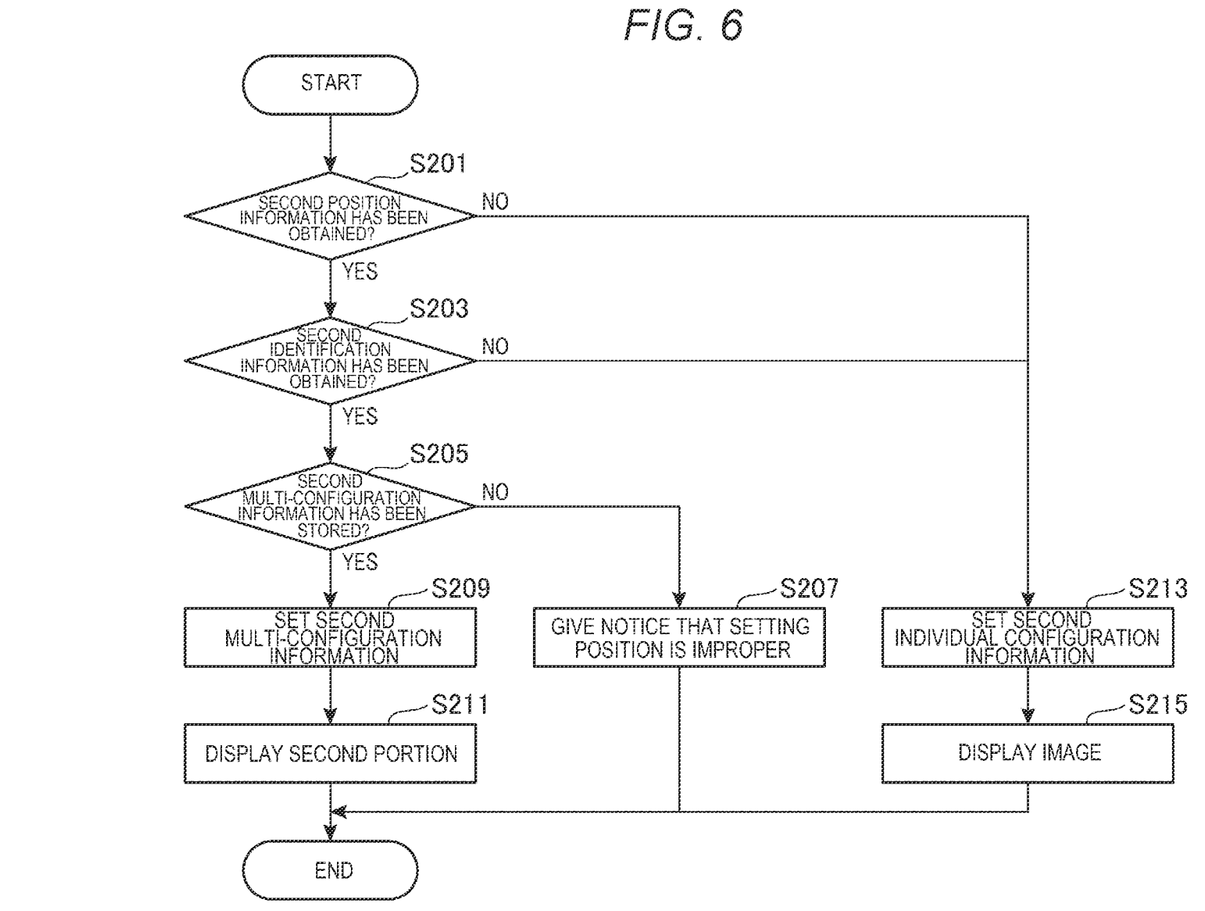
FIG. 6 is a diagram showing an example of processing of a processor of a second projector.

FIG. 6 is a diagram showing an example of the processing of the processor 253 of the second projector 200B. It should be noted that in the description of FIG. 6, the processor 253 of the second projector 200B is described as the processor 253 for the sake of convenience.

As shown in FIG. 6, in the step S201, the processor 253 judges whether or not the second position information PS2 has been obtained from the second NFC tag 342.

When the processor 253 judges that the second position information PS2 has not been obtained from the second NFC tag 342 (NO in the step S201), the process proceeds to the step S213. When the processor 253 judges that the second position information PS2 has been obtained from the second NFC tag 342 (YES in the step S201), the process proceeds to the step S203.

Then, in the step S203, the processor 253 judges whether or not the second identification information DT2 has been obtained from the second NFC tag 342.

When the processor 253 judges that the second identification information DT2 has not been obtained from the second NFC tag 342 (NO in the step S203), the process proceeds to the step S213. When the processor 253 judges that the second identification information DT2 has been obtained from the second NFC tag 342 (YES in the step S203), the process proceeds to the step S205.

Then, in the step S205, the processor 253 judges whether or not the storage 237 of the second projector 200B has stored the second multi-configuration information SM2.

When the processor 253 judges that the storage 237 of the second projector 200B has not stored the second multi-configuration information SM2 (NO in the step S205), the process proceeds to the step S207.

Then, in the step S207, the processor 253 gives notice that the installation position of the second projector 200B is inappropriate. For example, the processor 253 displays the OSD representing the fact that the installation position of the second projector 200B is inappropriate on the screen SC. Subsequently, the process is terminated.

When the processor 253 judges that the storage 237 of the second projector 200B has stored the second multi-configuration information SM2 (YES in the step S205), the process proceeds to the step S209.

Then, in the step S209, the processor 253 sets the second multi-configuration information SM2 as a projection condition of the second projector 200B.

Then, in the step S211, the processor 253 displays the second portion of the single image PV based on the second multi-configuration information SM2. Subsequently, the process is terminated.

In the case of NO in the step S201, or in the case of NO in the step S203, the processor 253 sets the second individual configuration information SP2 as the projection condition of the second projector 200B in the step S213.

Then, in the step S215, the processor 253 displays an image based on the second individual configuration information SP2. Subsequently, the process is terminated.

The step S201 and the step S203 correspond to an example of a "second acquisition step." The step 3205 corresponds to an example of a "second judgment step." A pair of the step S209 and the step S211, and a pair of the step S213 and the step 3215 correspond to an example of a "second display step." The step S207 corresponds to an example of a "second notification step."

As described above, when it is judged that the storage 237 of the second projector 200B has not stored the second multi-configuration information SM2, the processor 253 gives notice that the installation position of the second projector 200B is inappropriate. Therefore, it is possible for the user to easily recognize the fact that the installation position of the second projector 200B is inappropriate. Therefore, it is possible to enhance the convenience of the user.

Further, when it is judged that the second position information PS2 and the second identification information DT2 are obtained, and the second multi-configuration information SM2 is stored, the second projector 200B displays the second portion of the single image PV based on the second multi-configuration information SM2. Therefore, when the second projector 200B is disposed on the mounting member 300, it is possible to easily make the second projector 200B display the second portion of the single image PV.

Further, when at least one of the second position information PS2 and the second identification information DT2 fails to be obtained, the processor 253 displays the single image based on the second individual configuration information SP2 as the configuration information when displaying the single image by the second projector 200B alone. Therefore, when the second projector 200B is detached from the mounting member 300, it is possible to easily make the second projector 200B display the single image by itself.

Figure 7:
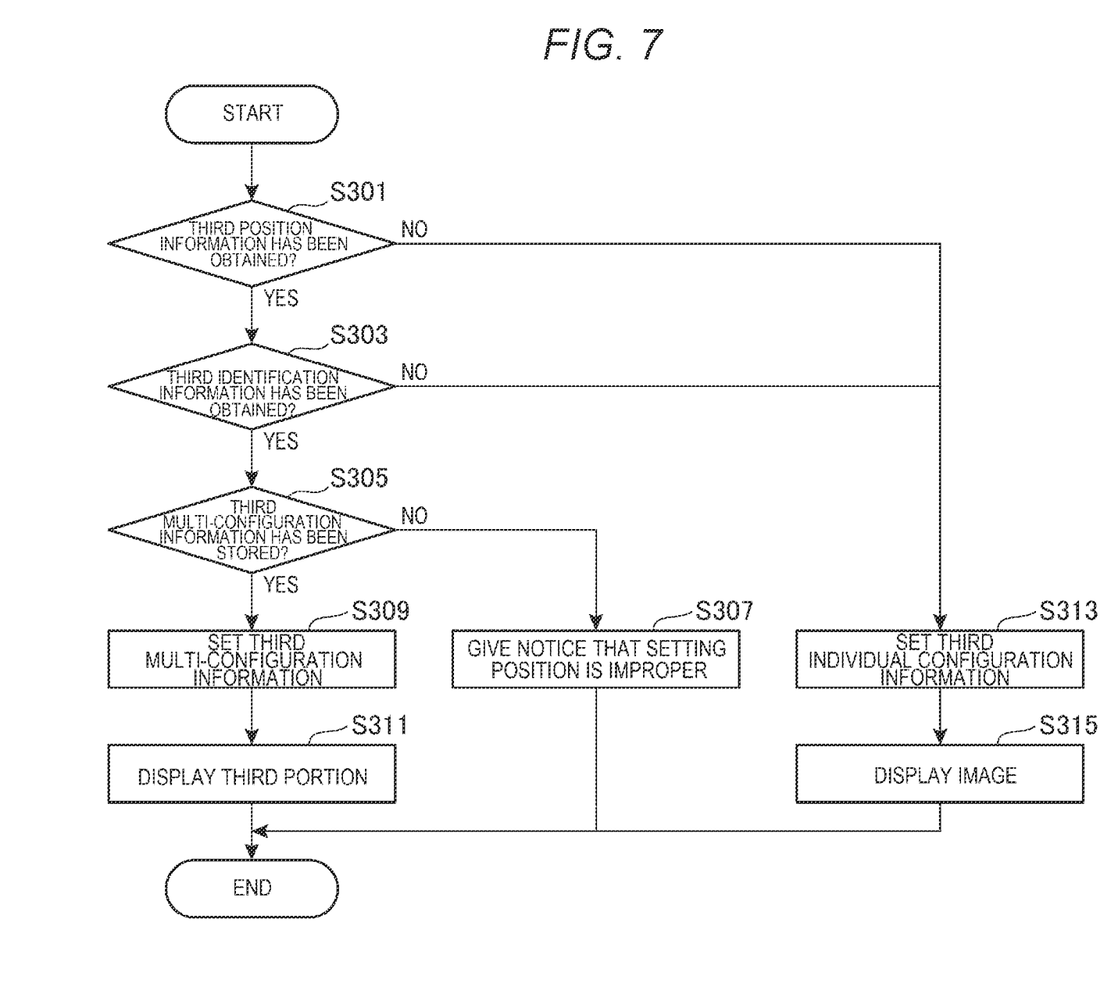
FIG. 7 is a diagram showing an example of processing of a processor of a third projector.

FIG. 7 is a diagram showing an example of the processing of the processor 253 of the third projector 200C. It should be noted that in the description of FIG. 7, the processor 253 of the third projector 200C is described as the processor 253 for the sake of convenience.

As shown in FIG. 7, in the step S301, the processor 253 judges whether or not the third position information PS3 has been obtained from the third NFC tag 343.

When the processor 253 judges that the third position information PS3 has not been obtained from the third NFC tag 343 (NO in the step S301), the process proceeds to the step S313. When the processor 253 judges that the third position information PS3 has been obtained from the third NFC tag 343 (YES in the step S301), the process proceeds to the step S303.

Then, in the step S303, the processor 253 judges whether or not the third identification information DT3 has been obtained from the third NFC tag 343.

When the processor 253 judges that the third identification information DT3 has not been obtained from the third NFC tag 343 (NO in the step S303), the process proceeds to the step S313. When the processor 253 judges that the third identification information DT3 has been obtained from the third NFC tag 343 (YES in the step S303), the process proceeds to the step S305.

Then, in the step S305, the processor 253 judges whether or not the storage 237 of the third projector 200C stores the third multi-configuration information SM3.

When the processor 253 judges that the storage 237 of the third projector 200C has not stored the third multi-configuration information SM3 (NO in the step S305), the process proceeds to the step S307.

Then, in the step S307, the processor 253 gives notice that the installation position of the third projector 200C is inappropriate. For example, the processor 253 displays the OSD representing the fact that the installation position of the third projector 200C is inappropriate on the screen SC. Subsequently, the process is terminated.

When the processor 253 judges that the storage 237 of the third projector 200C has stored the third multi-configuration information SM3 (YES in the step S305), the process proceeds to the step S309.

Then, in the step S309, the processor 253 sets the third multi-configuration information SM3 as a projection condition of the third projector 200C.

Then, in the step S311, the processor 253 displays the third portion of the single image PV based on the third multi-configuration information SM3. Subsequently, the process is terminated.

In the case of NO in the step S301, or in the case of NO in the step S303, the processor 253 sets the third individual configuration information SP3 as the projection condition of the third projector 200C in the step S313.

Then, in the step S315, the processor 253 displays an image based on the third individual configuration information SP3. Subsequently, the process is terminated.

As described above, when it is judged that the storage 237 of the third projector 200C has not stored the third multi-configuration information SM3, the processor 253 gives notice that the installation position of the third projector 200C is inappropriate. Therefore, it is possible for the user to easily recognize the fact that the installation position of the third projector 200C is inappropriate. Therefore, it is possible to enhance the convenience of the user.

Further, when it is judged that the third position information PS3 and the third identification information DT3 are obtained, and the third multi-configuration information SM3 is stored, the third projector 200C displays the third portion of the single image PV based on the third multi-configuration information SM3. Therefore, when the third projector 200C is disposed on the mounting member 300, it is possible to easily make the third projector 200C display the third portion of the single image PV.

Further, when at least one of the third position information PS3 and the third identification information DT3 fails to be obtained, the processor 253 displays the single image based on the third individual configuration information SP3 as the configuration information when displaying the single image by the third projector 200C alone. Therefore, when the third projector 200C is detached from the mounting member 300, it is possible to easily make the third projector 200C display the single image by itself.

As described hereinabove with reference to FIG. 1 through FIG. 7, the display method according to the present embodiment includes, when at least the first projector 200A and the second projector 200B project the projection light to thereby display the first single image PV, trying, by the first projector 200A, to obtain the first position information PS1 representing the installation position of the first projector 200A, trying, by the second projector 200B, to obtain the second position information PS2 representing the installation position of the second projector 200B, judging, by the first projector 200A, whether or not the first multi-configuration information SM1 corresponding to the first position information PS1 is stored when the first position information PS1 is obtained, judging, by the second projector 200B, whether or not the second multi-configuration information SM2 corresponding to the second position information PS2 is stored when the second position information PS2 is obtained, displaying, by the first projector 200A, the first portion of the first single image PV based on the first multi-configuration information SM1 when it is judged that the first multi-configuration information SM1 is stored, and displaying, by the second projector 200B, the second portion of the first single image PV based on the second multi-configuration information SM2 when it is judged that the second multi-configuration information SM2 is stored.

In other words, when it is judged that the first position information PS1 is obtained, and the first multi-configuration information SM1 corresponding to the first position information PS1 is stored, the first projector 200A displays the first portion of the first single image PV based on the first multi-configuration information SM1. When it is judged that the second position information PS2 is obtained, and the second multi-configuration information SM2 corresponding to the second position information PS2 is stored, the second projector 200B displays the second portion of the first single image PV based on the second multi-configuration information SM2. Therefore, since it is possible to display the first single image PV using the configuration information (the first multi-configuration information SM1 and the second multi-configuration information SM2) currently stored without performing the setting of the projectors 200 every time, it is possible to easily make the first projector 200A display the first portion of the first single image PV and the second projector 200B display the second portion of the first single image PV. Therefore, it is possible to decrease the time and effort of the user in setting the projection condition to each of the plurality of projectors 200 when making the plurality of projectors 200 project the projection light to display the single image PV.

Further, in the display method according to the present embodiment, when the first position information PS1 fails to be obtained, the first projector 200A displays the second single image based on the first individual configuration information SP1 as the configuration information for displaying the second single image by the first projector 200A alone.

Therefore, when the first position information PS1 fails to be obtained, it is possible to display the second single image using the configuration information (the first individual configuration information SP1) currently stored without performing the setting of the first projector 200A every time, and therefore, it is possible to easily display the second single image. Therefore, it is possible to decrease the time and effort of the user when the first projector 200A displays the single image by itself.

Further, in the display method according to the present embodiment, when the first projector 200A tries to obtain the first identification information DT1 representing the projector 200 corresponding to the installation position of the first projector 200A, and the first position information PS1 and the first identification information DT1 are obtained, the first projector 200A judges whether or not the first multi-configuration information SM1 corresponding to the first position information PS1 and the first identification information DT1 is stored. Further, when the second projector 200B tries to obtain the second identification information DT2 representing the projector 200 corresponding to the installation position of the second projector 200B, and the second position information PS2 and the second identification information DT2 are obtained, the second projector 200B judges whether or not the second multi-configuration information SM2 corresponding to the second position information PS2 and the second identification information DT2 is stored.

In other words, the first projector 200A judges whether or not the first multi-configuration information SM1 corresponding to the first position information PS1 and the first identification information DT1 is stored, and the second projector 200B judges whether or not the second multi-configuration information SM2 corresponding to the second position information PS2 and the second identification information DT2 is stored. Further, the first identification information DT1 is information for identifying the first projector 200A, and the second identification information DT2 is information for identifying the second projector 200B. Therefore, it is possible to more appropriately judge whether or not the first multi-configuration information SM1 and the second multi-configuration information SM2 are stored.

Further, in the display method according to the present embodiment, when the first identification information DT1 fails to be obtained, the first projector 200A displays the second single image based on the first individual configuration information SP1 as the configuration information when displaying the second single image by the first projector 200A alone.

Therefore, when the first identification information DT1 fails to be obtained, it is possible to display the second single image using the configuration information (the first individual configuration information SP1) currently stored without performing the setting of the first projector 200A every time, and therefore, it is possible to easily make the first projector 200A display the second single image alone. Therefore, it is possible to decrease the time and effort of the user when the first projector 200A displays the second single image by itself.

Further, the display method according to the present embodiment further includes giving notice that the installation position of the first projector 200A is not the appropriate position when it is judged that the first multi-configuration information SM1 is not stored.

The fact that the first multi-configuration information SM1 is not stored means that the first current position information and the first individual information do not coincide with the first position information PS1 and the first identification information DT1 stored in the storage 237, namely the installation position of the first projector 200A is not correct. Therefore, it is possible for the user to easily recognize the fact that the installation position of the first projector 200A is inappropriate. Therefore, it is possible to enhance the convenience of the user.

The image projection system 1 according to the present embodiment is the image projection system 1 in which at least the first projector 200A and the second projector 200B project the projection light to thereby display the single image PV, and includes trying, by the first projector 200A, to obtain the first position information PS1 representing the installation position of the first projector 200A, trying, by the second projector 200B, to obtain the second position information PS2 representing the installation position of the second projector 200B, judging, by the first projector 200A, whether or not the first multi-configuration information SM1 corresponding to the first position information PS1 is stored when the first position information PS1 is obtained, judging, by the second projector 200B, whether or not the second multi-configuration information SM2 corresponding to the second position information PS2 is stored when the second position information PS2 is obtained, displaying, by the first projector 200A, the first portion of the single image PV based on the first multi-configuration information SM1 when it is judged that the first multi-configuration information SM1 is stored, and displaying, by the second projector 200B, the second portion of the single image PV based on the second multi-configuration information SM2 when it is judged that the second multi-configuration information SM2 is stored.

In other words, when it is judged that the first position information PS1 is obtained, and the first multi-configuration information SM1 corresponding to the first position information PS1 is stored, the first projector 200A displays the first portion of the single image PV based on the first multi-configuration information SM1. When it is judged that the second position information PS2 is obtained, and the second multi-configuration information SM2 corresponding to the second position information PS2 is stored, the second projector 200B displays the second portion of the single image PV based on the second multi-configuration information SM2. Therefore, since it is possible to display the single image PV using the configuration information (the first multi-configuration information SM1 and the second multi-configuration information SM2) currently stored without performing the setting of the projectors 200 every time, it is possible to easily make the first projector 200A display the first portion of the single image PV and the second projector 200B display the second portion of the single image PV. Therefore, it is possible to decrease the time and effort of the user in setting the projection condition to each of the plurality of projectors 200 when making the plurality of projectors 200 project the projection light to display the single image PV.

Further, the image projection system 1 according to the present embodiment is further provided with the mounting member 300 on which the first projector 200A and the second projector 200B are mounted, and the mounting member 300 is provided with the first fixator 310 for fixing the position of the first projector 200A and the second fixator 320 for fixing the position of the second projector 200B.

In other words, the first fixator 310 fixes the position of the first projector 200A, and the second fixator 320 fixes the position of the second projector 200B. Therefore, it is possible to respectively fix the first projector 200A and the second projector 200B at the appropriate positions when making the plurality of projectors 200 project the projection light to display the single image PV. Therefore, it is possible to decrease the time and effort of the user in setting the respective positions of the plurality of projectors 200.

Further, in the image projection system 1 according to the present embodiment, the mounting member 300 is further provided with the first NFC tag 341 which is disposed at the position corresponding to the first position information PS1 and stores the first position information PS1, and the second NFC tag 342 which is disposed at the position corresponding to the second position information PS2 and stores the second position information PS2, the first projector 200A tries to obtain the first position information PS1 from the first NFC tag 341, and the second projector 200B tries to obtain the second position information PS2 from the second NFC tag 342.

The first NFC tag 341 is disposed at the position corresponding to the first position information PS1, for example, the position where the first NFC tag 341 is opposed to the NFC reader 242 of the first projector 200A fixed to the first fixator 310, and stores the first position information PS1. The first projector 200A tries to obtain the first position information PS1 from the first NFC tag 341. Therefore, when the first projector 200A is fixed to the first fixator 310, the first projector 200A can easily obtain the first position information PS1 from the first NFC tag 341.

Further, the second NFC tag 342 is disposed at the position corresponding to the second position information PS2, for example, the position where the second NFC tag 342 is opposed to the NFC reader 242 of the second projector 200B fixed to the second fixator 320, and stores the second position information PS2. The second projector 200B tries to obtain the second position information PS2 from the second NFC tag 342. Therefore, when the second projector 200B is fixed to the second fixator 320, the second projector 200B can easily obtain the second position information PS2 from the second NFC tag 342.

The present embodiment described above is a preferred embodiment. It should be noted that the embodiment described above is not a limitation, but a variety of modified implementation are possible within the scope or the spirit thereof.

In the present embodiment, there is described when the number of the projectors 200 used in the stack projection is three with reference to FIG. 1 through FIG. 7, but this is not a limitation. The number of the projectors 200 used in the stack projection can be two, or can also be four or more.

In the present embodiment, there is described when the first projector 200A through the third projector 200C are used in the "stack projection," but it is sufficient for the first projector 200A through the third projector 200C to display the single image PV. For example, it is possible to use the first projector 200A through the third projector 200C in so-called "tiling projection."

In the present embodiment, the projection image is an image generated by the image supply device 100 reproducing the content, but this is not a limitation. The projection image can be a pattern image, or can also be a slide image constituted by a plurality of images.

In the present embodiment, there is given notice that the installation position of the first projector 200A is not the appropriate position when it is judged that the first multi-configuration information SM1 is not stored, but this is not a limitation. For example, it is possible to give notice that the installation position of the first projector 200A is not the appropriate position when, for example, the position information obtained by the first projector 200A does not match the first position information PS1. Further, it is possible to give notice that the installation position of the first projector 200A is not the appropriate position when the identification information obtained by the first projector 200A does not match the first identification information DT1.

In the present embodiment, there is described when the first multi-configuration information SM1 is stored in the storage 237 of the first projector 200A so as to correspond to the first position information PS1 and the first identification information DT1, but this is not a limitation. For example, it is sufficient for the first multi-configuration information SM1 to be stored in the storage 237 of the first projector 200A so as to correspond only to the first position information PS1 out of the first position information PS1 and the first identification information DT1.

Further, each of the functional sections of the projector 200 shown in FIG. 2 is for showing the functional configuration, and the specific mounting configurations are not particularly limited. In other words, it is not necessarily required to install the hardware individually corresponding to each of the functional sections, but it is possible to adopt a configuration of realizing the functions of the plurality of functional sections by a single processor executing a program. Further, a part of the function realized by software in the embodiment described above can also be realized by hardware, or a part of the function realized by hardware can also be realized by software. Besides the above, the specific detailed configuration of each of other sections of the projector 200 can arbitrarily be modified within the scope or the spirit.

Further, the processing unit of the flowchart shown in FIG. 5 through FIG. 7 is obtained by dividing the processing of the projector 200 in accordance with major processing contents in order to make the processing of the projector 200 easy to understand. The way of division or the names of the processing units shown in the flowchart in each of FIG. 5 through FIG. 7 are not limitations, and it is also possible to divide the processing into a larger number of processing units, or it is also possible to divide the processing so that one processing unit includes a larger amount of processing in accordance with the processing contents. Further, the processing sequence of the flowcharts described above is not limited to the illustrated example.

Further, the display method of the image projection system 1 can be realized by making the processors 253 provided to the projectors 200 execute the control program corresponding to the display method of the image projection system 1. Further, it is also possible to record the control program on a recording medium which stores the program in a computer readable manner. As the recording medium, there can be used a magnetic or optical recording medium, or a semiconductor memory device. Specifically, there can be cited a portable or rigid recording medium such as a flexible disk, an HDD (Hard Disk Drive), a CD-ROM (Compact Disc Read Only Memory), a DVD (Digital Versatile Disc), a Blu-ray (a registered trademark) disc, a magnetooptic disc, a flash memory, or a card-type recording medium. Further, the recording medium can also be a RAM, or a nonvolatile storage device such as a ROM or the HDD as an internal storage device provided to the projectors 200. Further, it is also possible to realize the display method of the image projection system 1 by storing the control program corresponding to the display method of the image projection system 1 in a server device or the like in advance, and then downloading the control program from the server device to the projectors 200.

What is claimed is:
1. A display method comprising:
when at least a first projector and a second projector project projection light to thereby display a first single image, trying, by the first projector, to obtain first current position information representing a current installation position of the first projector;

trying, by the second projector, to obtain second current position information representing a current installation position of the second projector;

determining, by the first projector, whether or not first configuration information corresponding to the first current position information is stored when the first current position information is obtained;

determining, by the second projector, whether or not second configuration information corresponding to the second current position information is stored when the second current position information is obtained;

displaying, by the first projector, a first portion of the first single image based on the first configuration information when it is determined that the first configuration information is stored;

displaying, by the second projector, a second portion of the first single image based on the second configuration information when it is determined that the second configuration information is stored;

trying, by the first projector, to obtain first individual information representing a projector corresponding to the current installation position of the first projector; and when either obtaining the first current position information is failed, or when obtaining the first individual information is failed, the first projector displays a second single image based on configuration information for displaying the second single image by the first projector alone without any other projector producing the second single image.

2. The display method according to claim 1, further comprising:

determining, by the first projector, whether or not the first configuration information corresponding to the first current position information and the first individual information is stored when the first current position information and the first individual information are obtained;

trying, by the second projector, to obtain second individual information representing a projector corresponding to the current installation position of the second projector; and determining, by the second projector, whether or not the second configuration information corresponding to the second current position information and the second individual information is stored when the second current position information and the second individual information are obtained.

3. The display method according to claim 1, further comprising:

giving notice that the installation position of the first projector is not an appropriate position when it is determined that the first configuration information is not stored.

4. A display system comprising:
a first projector; and
a second projector, wherein
the first projector and the second projector at least project projection light to thereby display a single image, the first projector includes one or more first projector processors programmed to try to obtain first current position information representing a current installation position of the first projector, determine whether or not first configuration information corresponding to the first current position information is stored when the first current position information is obtained, and display a first portion of the single image based on the first configuration information when it is determined that the first configuration information is stored, and the second projector includes one or more second projector processors programmed to try to obtain second current position information representing a current installation position of the second projector, determine whether or not second configuration information corresponding to the second current position information is stored when the second current position information is obtained, and display a second portion of the single image based on the second configuration information when it is determined that the second configuration information is stored; and the one or more first projector processors are further programmed to try to obtain first individual information representing a projector corresponding to the current installation position of the first projector, and when either obtaining the first current position information is failed, or when obtaining the first individual information is failed, control the first projector to display a second single image based on configuration information for displaying the second single image by the first projector alone without any other projector producing the second single image.

5. The display system according to claim 4, further comprising:

a mounting member on which the first projector and the second projector are mounted, the mounting member includes a first fixator configured to fix the first projector, and
a second fixator configured to fix the second projector.

6. The display system according to claim 5, wherein the mounting member further includes a first memory which is disposed at a position corresponding to the first fixator, and stores first position information, and a second memory which is disposed at a position corresponding to the second fixator, and stores second position information, the one or more first projector processors are further programmed to try to obtain the first position information as the first current position information from the first memory when installed in the first fixator, and the one or more second projector processors are further programmed to try to obtain the second position information as the second current position information from the second memory when installed in the second fixator.

* * * * *